INVENTOR.
GEORGE P. WAKEFIELD
BY
Oberlin & Limbach
ATTORNEYS.

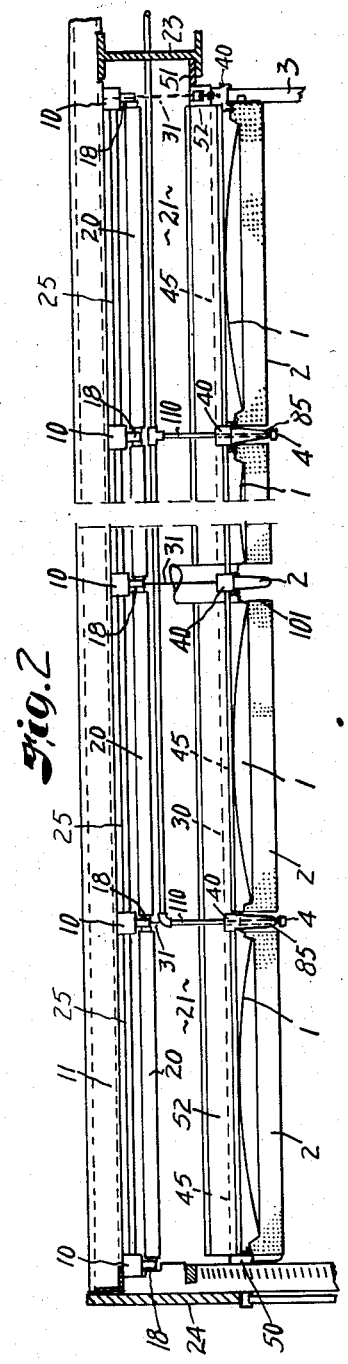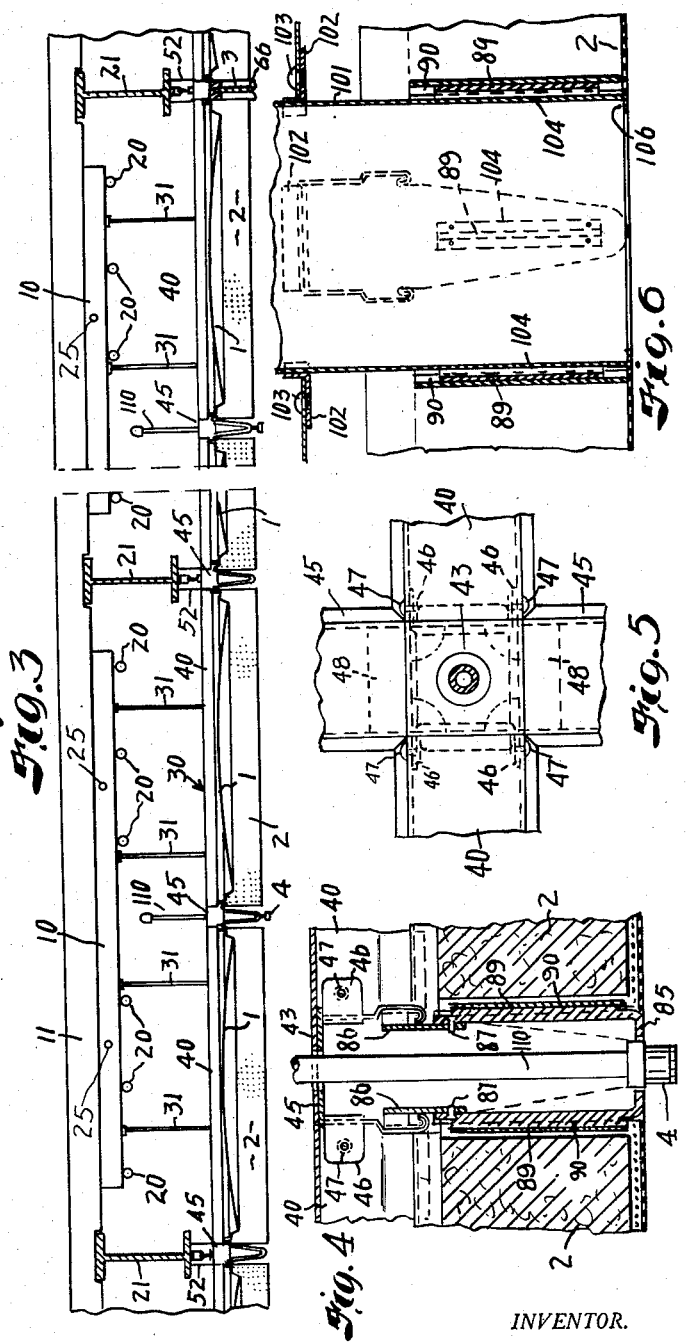
INVENTOR.
GEORGE P. WAKEFIELD
BY
Oberlin & Limbach
ATTORNEYS.

April 28, 1959 G. P. WAKEFIELD 2,884,512
OVERHEAD LIGHTING AND ROOM CONDITIONING SYSTEM
Filed Oct. 30, 1953 4 Sheets-Sheet 3
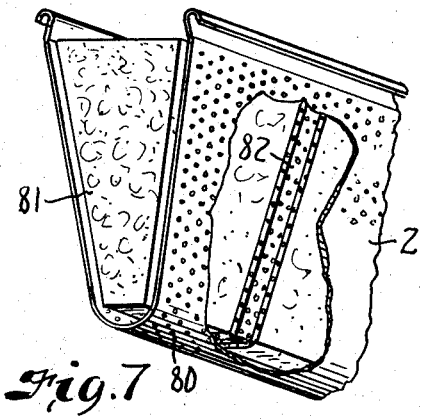
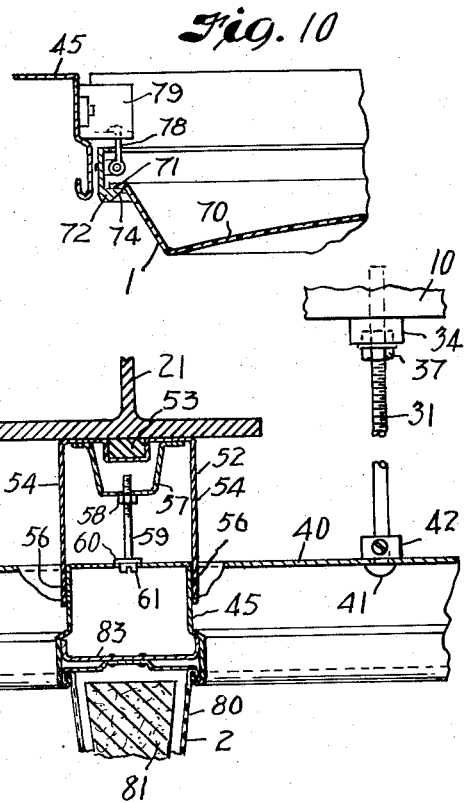
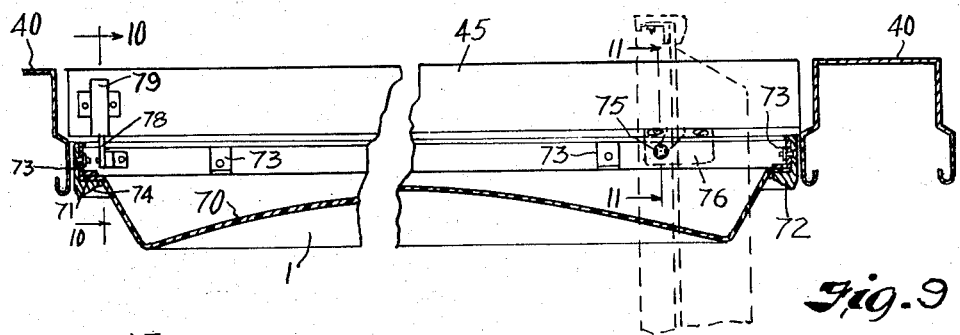
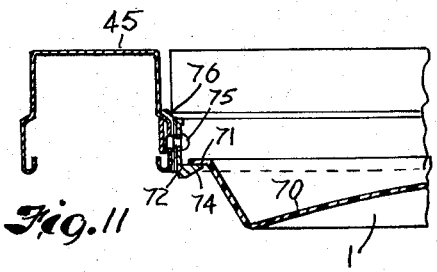
INVENTOR.
GEORGE P. WAKEFIELD
BY
Oberlin & Limbach
ATTORNEYS.

April 28, 1959 G. P. WAKEFIELD 2,884,512
OVERHEAD LIGHTING AND ROOM CONDITIONING SYSTEM
Filed Oct. 30, 1953 4 Sheets-Sheet 4

INVENTOR.
GEORGE P. WAKEFIELD
BY
Oberlin & Limbach
ATTORNEYS.

United States Patent Office 2,884,512
Patented Apr. 28, 1959

2,884,512

OVERHEAD LIGHTING AND ROOM CONDITIONING SYSTEM

George P. Wakefield, Vermilion, Ohio, assignor to The Wakefield Company, a corporation of Ohio Application October 30, 1953, Serial No. 389,419

4 Claims. (Cl. 240—9)

The present invention relates generally as indicated to overhead lighting and room conditioning structures and more particularly to structures which provide a pleasing total environment including large-area, low-brightness illumination for visual comfort, acoustical control for auditory comfort, ventilation or air conditioning for personal comfort, and other room conditioning control such as fire protection and the like.

The present application is a continuation in part of my copending application, Serial No. 93,620, filed May 16, 1949, now Patent No. 2,659,807, granted November 17, 1953, wherein are disclosed several overhead lighting structures having associated with their supporting framework for light-diffusing elements, various room conditioning elements, viz. baffles for sound absorption and light shielding, air flow passages for ventilation or air conditioning, and sprinkler nozzles for fire protection.

Heretofore, and prior to my aforesaid invention, overhead lighting structure as then known was composed simply of light-diffusing panels supported independently of the lighting system thereabove to define a translucent sub-ceiling area spaced beneath the ceiling proper of a room space; and although such structure afforded a more or less satisfactory solution to the problem of overall, diffused illumination, it yet left much to be desired in the way of providing an integrated structure with reference to the room conditioning elements aforesaid and with reference to singleness of responsibility of installation thereof and to avoidance of craft dispute. In the present construction, and also those disclosed in the parent application aforesaid, the lighting system is the base unit from which is hung the supporting framework for light-diffusing panels, and for room conditioning elements such as sound-absorbing baffles, sprinkler nozzles, and air flow ducts.

A general object of this invention is to provide an overhead structure of the character indicated which is architecturally co-ordinated with the building structure on a module basis so that the overhead lighting structure fits in with beam spacings and depths, fenestration spacings and sizes, and has a large degree of versatility insofar as increase or decrease of the illuminated area and the location and number of room conditioning elements employed therewith are concerned. The module design affords convenience in the making of any changes in the areas of lighting, ventilation, fire protection, and acoustical control.

Another object of this invention is to provide an overhead structure of the character indicated in which a grid-like supporting framework for light-diffusing panels is designed for interchangeably accommodating acoustical baffles, or room partitions.

Another object of this invention is to provide an overhead lighting structure in which room conditioning elements such as sprinklers, and air diffusers, for example, extend through the grid-like supporting framework for the light-diffusing panels of the lighting system, so as not to obstruct the overall, diffused illumination; the panels serving additionally to shield the plumbing, air ducts, and other construction work in the space thereabove.

Another object of this invention is to provide novel couplings which join together the structural elements of the grid-like panel support framework, the couplings preferably being of hollow or tubular form so that room conditioning elements such as sprinkler nozzles and air diffusers may extend therethrough.

Another object of this invention is to provide a grid-like support structure of module dimensions as previously referred to, from which acoustical baffles and baffle connectors are detachably hung for interchanging with partitions so that a room area may be subdivided into smaller rooms of any desired size equal to the module dimensions or multiples thereof.

Another object of this invention is to provide a grid-like or criss-cross arrangement of light-diffusing panel support rails wherein the room conditioning elements aforesaid are disposed at the intersections of the rails.

Another object of this invention is to provide an acoustical baffle having novel means therein for maintaining its body of sound-absorbing material in spaced relation to the perforate casing.

Another object of this invention is to provide a novel means of leveling and of imparting lateral stability to the light-diffusing panel support framework without requiring any direct mechanical connections of said framework to the beams of the building structure, said means further providing a sound stop to prevent transmission of noise from one section of the room space to another through the space between the ceiling proper and said panel support framework.

Another object of this invention is to provide an overhead structure of the character indicated in which air can be introduced into and/or exhausted from the room space therebelow through openings in the light-shielding or acoustical baffles and also in which sprinkler nozzles can similarly be arranged to extend through said baffles.

Another object of this invention is to provide a novel light-diffusing panel design which can be made in relatively large size as, for example, about 5' square, and yet can be fabricated from thin material, without sagging, to effect substantial reduction in weight and cost.

Another object of this invention is to provide lighting system channels which are equipped with sockets to receive the ends of a parallel series of tubular illuminators extending cross-wise from one channel to the next and which are laterally and longitudinally adjustable with respect to ceiling-anchored fastening devices so that the channels may be spaced apart a proper distance and so that the sockets of the successive channels may be aligned.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Figs. 2 and 3 are cross-section views of an embodiment of the invention similar to that illustrated in Fig. 1, such views having been taken in vertical planes respectively lengthwise and cross-wise of the rows of illuminators;

Fig. 4 is a cross-section view on an enlarged scale to show particularly the couplings for joining together the criss-cross panel support members and the criss-cross acoustical baffles, said couplings being hollow to accommodate the water supply pipe for a sprinkler nozzle;

Fig. 5 is a top plan view of Fig. 4;

Fig. 6 is a cross-section view taken at another intersection of the panel support members and acoustical baffles, the coupling in this case being hollow as are the couplings in Fig. 4 but of a size to accommodate an air diffuser or the like;

Fig. 7 is a fragmentary perspective view of a preferred form of acoustical baffle which is adapted to be detachably secured to one of the intersecting support members;

Figure 12:
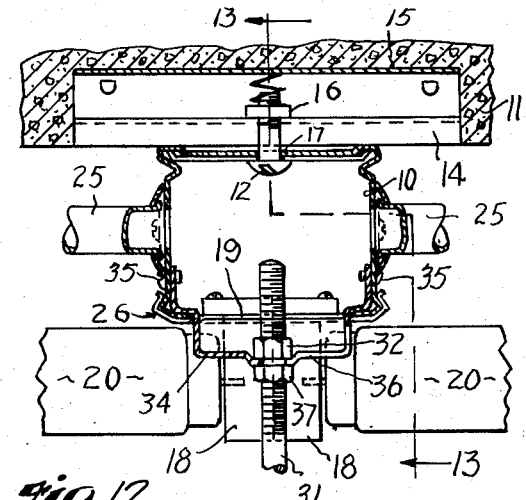
Figure 13:
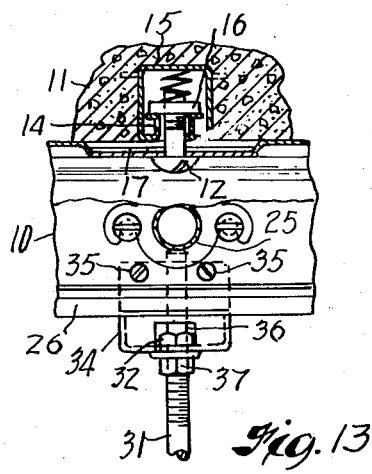
Figure 14:
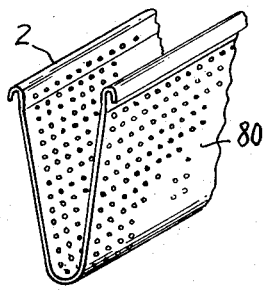
Figure 15:
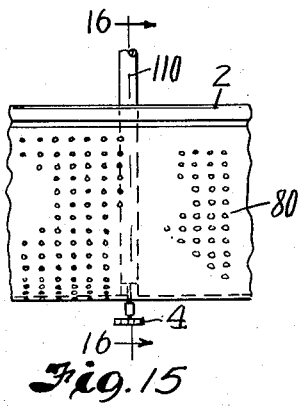
Figure 16:
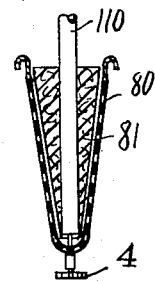
Figure 17:
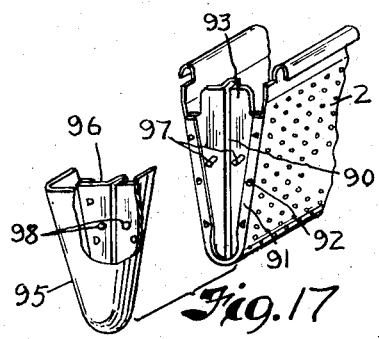
Figure 18:
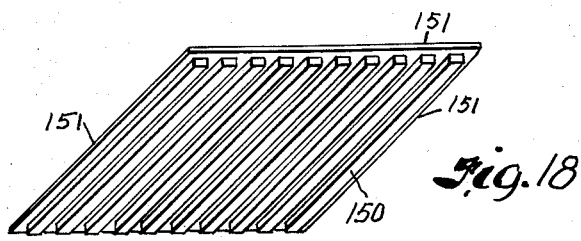

Fig. 8 is a cross-section view, on an enlarged scale, to show the adjustable hanger rod structure for suspending the panel support members from the lighting system in parallel, spaced apart relation and in spaced relation beneath the ceiling proper of a room space, said Fig. 8 further illustrating the acoustical stop feature which prevents noise transmission through the space above the light-diffusing sub-ceiling and which also imparts lateral stability to the sub-ceiling structure as a whole;

Fig. 9 is a cross-section view between adjacent panel support members to show one manner of mounting light-diffusing panels for swinging movement with respect to and for detachment from the sub-ceiling framework;

Fig. 10 is a cross-section view taken substantially along the line 10—10, Fig. 9;

Fig. 11 is a cross-section view taken substantially along the line 11—11, Fig. 9;

Fig. 12 is a transverse cross-section view through one of the lighting system channels, showing its laterally adjustable attachment to the ceiling proper;

Fig. 13 is a cross-section view taken substantially along the line 13—13, Fig. 12, showing the longitudinally adjustable attachment of a lighting system channel to the ceiling proper;

Fig. 14 is a fragmentary perspective view of a false acoustical baffle through the perforations of which ventilating air may be introduced into the room space;

Fig. 15 is a fragmentary side elevation view of an acoustical baffle showing a water supply pipe extending downwardly therethrough, the lower end of said pipe having a sprinkler nozzle secured thereto;

Fig. 16 is a cross-section view taken substantially along the line 16—16, Fig. 15;

Fig. 17 is a perspective view of the end portion of an acoustical baffle and of an end cap therefor; and Fig. 18 is a perspective view of a light-diffusing panel which is of a design to provide sound-deadening pockets and to impart strength against sagging so that the panel itself may be of relatively large size and fabricated from thin plastic or like material.

Figure 1:
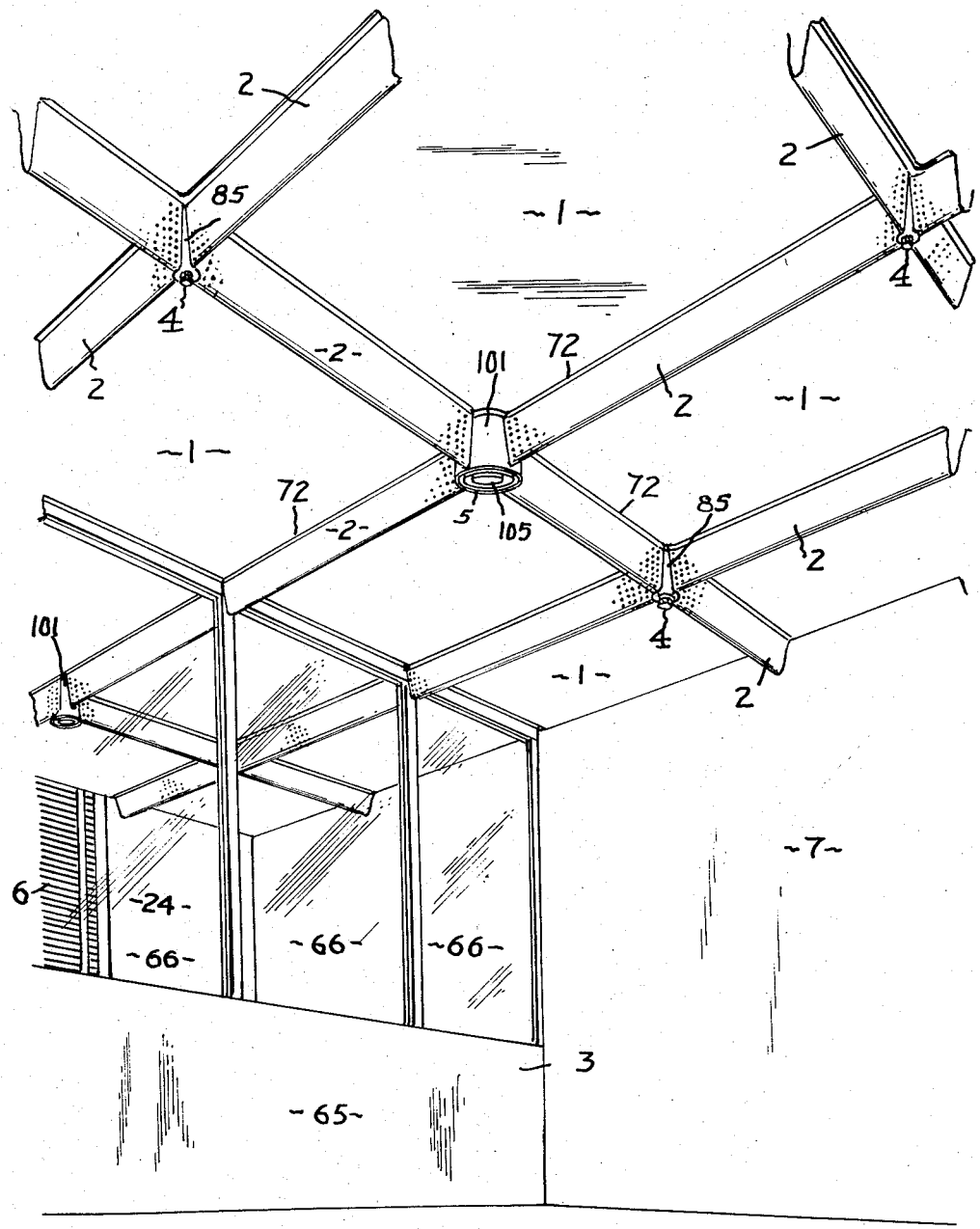
Fig. 1 is a fragmentary perspective view of an illustrative embodiment of the present invention.

General structure (Fig. 1)

The present overhead lighting and room conditioning structure is designed on a module basis, the module dimension being, for example, five feet center distance between the criss-cross support members for the light-diffusing panels 1, the aforesaid criss-cross support members accommodating room conditioning elements such as acoustical baffles 2 which are detachable and interchangeable for glazed partitions 3 or the like, and sprinkler nozzles 4 and air diffusers 5 located at alternate intersections of said members, that is, ten feet apart.

This module design is carried through in the design of the building, the main longitudinal beams being spaced apart from each other and from the side walls of the building a distance of, for example, 25 feet, the cross-beams being spaced apart, for example, 10 feet, and the fenestrations 6 being of such size and spacing that partitions 3, wherever installed, will never be in the middle or other in-between portion of a fenestration. Furthermore, the main and cross beam spacings are such that their depths are less than the preferred distance from the ceiling proper to the light-diffusing panel support framework.

The overhead lighting and room conditioning structure as illustrated in Fig. 1 screens or conceals the lighting system, the beams of the building, the plumbing system for the sprinklers 4, the air ducts for the air diffusers 5, and all other structure above the light-diffusing panels 1 while yet none of the so-called room conditioning elements, viz. the acoustical baffles 2, sprinklers 4, and air diffusers 5, obscure or reduce the efficiency of the overall, uniform, diffused lighting afforded by the overhead structure. Moreover, the area of the structure can be readily increased or reduced in size, and because the partitions 3 are interchangeable with the acoustical baffles 2, a large room area may be subdivided into smaller rooms having dimensions equal to the module dimensions or multiples thereof. In addition to the architectural co-ordination of the building structure and overhead lighting and room conditioning structure in the particulars aforesaid, permanent partition walls 7 are also spaced apart a distance equal to a multiple of the module dimension.

Structure of Figs. 1 to 13 and 17

*Lighting system.*—As best shown in Figs. 2, 3, 12, and 13, the lighting system comprises a series of lighting channels 10 laterally adjustably secured to the ceiling proper of a room space in desired spaced apart parallel relation to one another as by means of screws 12 which extend through slots 14 in the ceiling-embedded members 15 and which screws have threaded engagement with spring-loaded non-rotatable nuts 16 movable longitudinally of said members 15. The screws 12 extend through longitudinal slots 17 in said channels to provide for longitudinal adjustment of said channels 10 so that the opposed lamp holders 18 (secured to plates 19 across the bottom open sides of the channels) together with the fluorescent or like tubular illuminators 20 held thereby will be perpendicular to the parallel channels 10. In other words, the lateral adjustment of the channels 10 achieves proper spacing thereof for receiving the ends of the illuminators 20 in the lamp holders 18 and the longitudinal adjustment of the channels achieves a ladder-like or rectangular arrangement of the channels and the illuminators.

In this particular case, the channels 10 are spaced uniform distances apart, corresponding to the 5' module unit. As shown in Fig. 3, the beams 21 of the building construction are spaced apart two module units, that is, 10 feet, and between each pair of adjacent beams 21 there is provided a series of channels 10 equipped with sockets or lamp holders 18 for six rows of illuminators 20, the rows of illuminators preferably being spaced apart approximately 1¼' in each module unit and a corresponding distance above the light-diffusing panels 1.

As shown in Fig. 2, the main beams 23 are spaced from the side walls 24, and from each other, in case there be more than one such main beam, a distance to accommodate therebetween, for example, five module units.

As best shown in Fig. 12, channel spacers 25 extend crosswise between adjacent channels 10, these spacers being secured at their ends to said channels to determine the spaces therebetween and further constituting wireways for wires which join the lamp holders to an electric power source. Snap-on cover plates 26 serve to close the bottom open sides of the channels 10.

*Sub-ceiling framework.*—The sub-ceiling framework 30 for supporting the light-diffusing panels 1 is hung from the lighting system (see Figs. 2 and 3) through series of hanger rods 31, which rods, as best shown in Figs. 12 and 13, have their upper end portions in threaded engagement with nuts 32 non-rotatably seated in bayonet straps 34, the latter being secured as by screws 35 to the lighting channels 10 and each being formed with a bayonet or keyhole slot 36 for insertion of said nut 32 and rod 31. A lock nut 37 is also threaded on each rod 31 to hold the rod in desired adjusted position.

Each length of lighting channel 10 is shown as having a series of four hanger rods 31 depending therefrom, the first two of which (also the last two of which) are secured at their lower ends to one of a series of downwardly opening receiving channels 40, to support the latter in longitudinally aligned relation to one another in parallel, spaced apart relation to series of channels 40 thus hung from the other lighting channels 10. The connection of the lower end portion of each hanger rod 31 to a receiving channel 40 is effected as shown in Fig. 8, that is, each rod has a bottom headed end 41 which underlies the top web of said receiving channel 40 and a collar 42, affixed to said rod, which overlies said top web so that rotation of said rod 31 in opposite directions with respect to nut 32 raises and lowers said receiving channel 40.

The receiving channels 40 thus supported by the series of hanger rods 31 are each of length so that its opposite ends are spaced from the ends of the adjacent channels for connection with a coupling 43, said couplings not only serving to join together the receiving channels 40 of each row but to support other receiving channels 45 in the same horizontal plane as the channels 40 and in parallel rows cross-wise of the rows of channels 40.

The coupling 43 referred to in the preceding paragraph is shown in Figs. 4 and 5 as comprising a sheet metal stamping having opposed pairs of ears 46 fitted within and secured as by screws 47 to the opposed spaced apart ends of successive receiving channels 40 and having oppositely extending tongues 48 underlying the top webs of the crosswise receiving channels 45 to thus support the latter. If desired or necessary, the channels 45 and tongues 48 may be secured together by screws or the like. As shown in Fig. 5, the ends of the receiving channels 40 and 45 are mitered to impart rigidity to the intersections thereof.

From the foregoing description, it is apparent that the sub-ceiling framework 30 is essentially a grid composed of perpendicular rows of channels 40 and 45 joined together at their intersections by couplings 43, said grid being suspended from the overhead lighting system by means of hanger rods 31. When the sub-ceiling framework 30 extends from wall-to-wall of a room area, the marginal edges may comprise filler strips 50 also suspended from rods 31 if desired. In such case, the couplings joining receiving channels 45 to strips 50, instead of being crosses (as are couplings 43), will be T's. When the sub-ceiling framework 30 terminates adjacent the main beam 23, a filler strip 51 serves to close the space between said beam and the last row of receiving channels 40, said strip 51 (see Fig. 2) preferably being of sound-deadening material and engaged with a sound stop channel 52 which is telescoped over the last row of said receiving channels 40. This sound stop channel 52 and the others associated with receiving channels 45 are next described under the heading "Sound Stops and Reinforcing Means for Sub-ceiling Framework."

*Sound stops and reinforcing means for sub-ceiling framework.*—Because the room area beneath the sub-ceiling framework 30 may be subdivided by partitions 3 or the like, it becomes desirable to prevent transmission of noise from one room space to another through the space between the ceiling proper 1 and the framework 30. Furthermore, in installations where the sub-ceiling framework 30 terminates short of the side walls 7 or 24 of the building, it becomes especially desirable to impart lateral stability or rigidity to such hung framework. The sound-stop channels 52 briefly described in the next preceding paragraph perform both of these desired functions, that is, prevention of noise transmission and imparting of lateral stability, by the simple expedient of exerting opposite forces between the beams 21 and the rows of receiving channels 45 thereunder, without requiring any special clamps, clips on the beams or any drilling of holes or machining of the beams.

As before mentioned, the beams 21 are spaced apart two module units so that alternate rows of receiving channels 45 are disposed in spaced relation beneath said beams. The sound-stop channels 52 are disposed between said alternate rows of channels 45 and the beams 21 thereabove, and as illustrated in Fig. 8, each sound-stop channel 52 has a top longitudinal groove in which is disposed a strip 53 of sound-deadening material such as rubber, felt, or the like and the sides 54 straddle the receiving channels 45 constituting such alternate rows, there being felt or like seals 56 between said sides 54 and channels 45. Said sound-stop channels 52 will, of course, be notched at the lower edges of sides 54 to clear the couplings 43 and the ends of the receiving channels 40.

Brackets 57 are spot welded or otherwise secured under the top web of each channel 52 at longitudinally spaced intervals and said brackets have nuts 58 welded thereto in which shoulder screws 59 are threaded. Said screws 59 have flanges or shoulders 60 bearing on the tops of channels 45 and slotted heads 61 extending through holes in said channels to enable turning of screws 59 from below to effect upward forcing of the channel 52 into tight frictional engagement with the beam 21 thereabove. The amount of overlap of the sides 54 with the sides of channels 45 is sufficient to maintain at least a small amount of overlap even though channels 52 may be deformed to longitudinally curved form conforming with the sagging or deflection of the beams between their ends.

The pressure thus exerted on the beams 21 and channels 45 has the effect of imparting lateral rigidity or reinforcement to the sub-ceiling framework 30 and also of tending to raise the portions of the framework at the regions of the alternate channels 45 which do not have sound-stop channels 52 associated therewith. Of course, one of the principal functions of channels 52 is to provide sound-stops in the space above the sub-ceiling framework.

*Partitioning of room areas beneath the sub-ceiling framework.*—The receiving channels 40 and 45 of the sub-ceiling framework 30 are joined together in criss-cross manner by couplings 43 as previously described, and each receiving channel has spaced apart lower edge portions which are turned inwardly and upwardly to receive therebetween glazed or other partitions 3 as shown in Figs. 1, 2, and 3, whereby the room area under the sub-ceiling framework may be sub-divided into rooms as small as 5' x 5' or any multiple of 5' in length and width, the module dimension in this case being 5'.

As shown, for example, in Fig. 1, the partitions 3 may be of conventional well known form and are here shown as comprising a metal framework sandwiched between panels 65 and providing openings for glass panes 66. The upper edges of said partitions 3 fit snugly between the lower edge portions of the receiving channels 40 or 45 and the lower edges are secured by nails, screws, or the like to the floor.

*Room conditioning elements or units.*—In the illustrative embodiments of the present invention, the room conditioning elements include (*a*) Overall Illumination, (*b*) Sound Absorption, (*c*) Ventilation or Air Conditioning, and (*d*) Fire Protection, of which (*b*), (*c*), and (*d*) are optional features, any or all of which may be omitted.

(*a*) *Overall illumination.*—The lighting system proper from which the sub-ceiling framework 30 is hung has already been described in detail, and therefore the description now is concerned only with the mounting or supporting of the light-diffusing panels 1 upon the sub-ceiling framework.

The light-diffusing panels 1 are shown in Figs. 1, 2, and 3, and the mounting thereof is best shown in the enlarged cross-section views Figs. 9, 10, and 11.

The light emanating from the rows of tubular lamps 20 of the lighting system is shielded and diffused by the light-diffusing panels 1 which are fitted in the openings defined by the receiving channels 40 and 45, and in the structure of Figs. 1 to 3 and 9 to 11, each light-diffusing panel 1 comprises a translucent plastic pan 70 having an arched, concavely curved bottom when viewed from below, and having a marginal flange 71 therearound, said pan being molded as, for example, from 1/8" thick plastic stock. The arched construction of the pan 70 imparts rigidity thereto to eliminate excessive sag thereof as would occur if flat plastic sheets approximately 5' square were employed.

Surrounding each light-diffusing pan 70 is an extruded or like aluminum frame 72 having clips 73 at spaced intervals to hold said marginal flange 71 against the inturned flange 74 of said frame. Said frame 72 has oppositely projecting trunnions 75 adjacent one end which fit into angularly slotted pieces 76 attached to the adjacent receiving channels 40 or 45, herein channels 45, and opposite latch elements 78 adjacent the other end for engagement with and disengagement from latch elements 79 also secured to the receiving channels 45. The latch mechanisms 78 and 79 are preferably of a type such that upward pressure exerted on the light-diffusing panel 1 at the lefthand side of Fig. 9 will disengage the latch elements 78 from elements 79 so that the panel 1 may be swung down to the vertical dotted-line position about the trunnions 75.

With the panel 1 thus swung to the dotted line position of Fig. 9, it is a simple matter to relamp or otherwise service the lighting, plumbing, or air conditioning system above the sub-ceiling framework 30. When it is desired to remove the panels 1 for washing the same, they can be raised to displace the trunnions 75 from the angularly slotted pieces 76 and when thus raised, said panels may be turned so that they will drop down between the receiving channels 45.

(b) *Sound-absorption.*—The receiving channels 40 and 45 which are not equipped with partitions 3 may have sound-absorbing baffles 2 suspended therefrom, said baffles being of length to extend between the receiving-channel couplings 43 or between couplings 43 and the air-diffuser couplings (see next heading "(c) Ventilation or Air Conditioning").

Each baffle 2 comprises, as shown in Fig. 7, a perforated metal casing 80 of generally V-shaped form formed at its upper edges with outwardly and downwardly turned portions which are adapted to detachably engage the inwardly and upwardly turned lower edge portions of the receiving channels 40 and 45. Within each acoustical baffle casing 80 is a body 81 of fibrous or other sound-absorbing material which is held in spaced relation to the side and bottom walls of the casing as by means of channel-shaped strips 82 disposed between said body 81 and said casing 80, such spacer strips being provided at intervals of, for example, 1½ feet. Although said baffle casings 80 are only about 25% open, the spacing of the sound-absorbing bodies 81 therein renders said casings substantially acoustically transparent. The casings therefore can be maintained in clean condition by washing or repainting without impairing the sound-absorbing properties to any noticeable degree.

As shown in Fig. 8, spring assemblies 83 in the receiving channels 40 and 45 serve to press the baffles 2 downwardly to retain the hooks thereof engaged with the channel hooks. The ends of the baffles 2 are joined together by means of baffle couplings 85 each of which, as shown in Fig. 4, comprises a square tubular body supported to extend downwardly below coupling 43, by means of hangers 86 which span the space between the ends of successive receiving channels 45 or 40, herein channels 45, and which have ends resting upon the channel hooks. Screws 87 are employed to connect said baffle coupling 85 to the hangers 86. Each side of said baffle coupling 85 has a vertical rib 89 which fits into a vertical groove 90 at the end of each baffle 2. As most clearly shown in Fig. 17, the opposite ends of each baffle casing 80 are formed with an inturned flange 91 which has slots therethrough to receive lugs 92 formed on end pieces 93, the lugs 92 being bent over, as shown, to attach pieces 93 to the ends of the baffle casings 80.

In instances where the acoustical baffles 2 do not extend to the side walls 7 or 24 of the room or to the partitions 3, end caps 95 (see Fig. 17) are secured thereto, said end caps each having a ribbed plate 96 attached thereto to fit in groove 90 of the baffle end. In such case, the baffle end piece 93 will have spring fasteners 97 fitted into holes 98 of plate 96 to retain and to position the end cap 95.

When air circulating equipment is installed at the intersections of the receiving channels 40 and 45, the baffle couplings 85 and channel couplings 43 are not required and said channels and baffles will be shorter in length than those which extend between adjacent couplings 43 and 85. In this case (see Fig. 6), the coupling 101 has brackets 102 extending under the top webs of channels 40 and 45 and secured thereto by screws 103, and ribbed pieces 104 provide the ribs 89 which fit into grooves 90 of the baffle ends. Because the couplings 101 are larger than couplings 43 and 85, the panel frames 72 will have concavely curved corners as most clearly shown in Fig. 1.

(c) *Ventilation or air conditioning.*—The coupling 101 at certain intersections of the receiving channels 40 and 45 and baffles 2, for example, every second intersection as in Fig. 1 constitutes a housing for an air diffuser 105 or the like, said diffuser (not shown in Fig. 6) being adapted to be supported as on the ledge 106 of said coupling. Air to be circulated by diffusers 105 may be introduced into the space above the panels 1, or if desired air ducts lead to couplings 101 or diffusers 105. Obviously, the couplings 101 may be employed to evacuate the room air therethrough.

Instead of introducing or evacuating air through couplings 101 disposed at certain intersections of the receiving channels 40 and 45, it may be desirable, in some instances, to do so through the perforated baffle casings 80 as shown in Fig. 14, that is, air may be supplied into the upper open portions of said casings 80 for flow into the room space through the perforations, and of course sound-absorbing material 81 may be used, inasmuch as the same is held in spaced relation to the walls of the casing. In this connection the sound-stop channels 52 could be used as air ducts and all that is necessary is to form large openings in the top webs of receiving channels 45.

(d) *Fire protection.*—The couplings 43 and 85 have openings therethrough through which water supply pipes 110 extend, the temperature-responsive sprinkler nozzles 4 being connected to the lower ends of said pipes to afford effective fire protection to the entire room area, said nozzles 4 preferably being spaced apart two module units, that is, 10 feet.

In Figs. 15 and 16 is shown an arrangement wherein the sprinkler pipe 110 extends through the acoustical baffle 2 and has secured to its lower end the sprinkler nozzle 4. In such construction the baffle couplings 85 may have closed bottom ends.

In Fig. 18 is shown a modified form of light-diffusing panel 150 which does not require a separate frame and which can be fabricated from considerably thinner plastic material in view of its special design. Thus, for example, the panel 150 may be made of .020" thick material and the generally corrugated form thereof between the flat marginal edge 151 provides sound-deadening pockets which, in addition to the acoustical baffles 2 if employed, provided further sound deadening.

The panels 150 may be substituted for panels 70 in frames 72 and as a further alternative the receiving channels 40 and 45, for example, may have attached thereto or integrally formed therewith the equivalent of the inturned flanges 74 upon which the margins 151 of panels 150 are supported. The last-mentioned alternative does away with the pivotal mounting of the panel, but the panels would yet be readily removable by tilting and turning the panels with respect to such supporting flanges.

Other modes of applying the principle of the invention may be employed, change being made as regards the details described, provided the features stated in any of the following claims, or the equivalent of such, be employed.

I therefore particularly point out and distinctly claim as my invention:

1. In combination, a building structure having a ceiling to which an overhead lighting system is secured and a series of relatively widely spaced apart beams supporting said ceiling, a sub-ceiling framework including parallel rails spaced beneath said beams and intervening parallel rails, means connected to said sub-ceiling framework at points between said beams for suspending said framework as aforesaid, a series of light-diffusing panels carried by said rails, sound stops having lower edge portions overlapping the rails that are spaced beneath said beams and upper edge portions adapted to frictionally engage said beams, and means bearing on the last-mentioned rails and said stops to urge the latter upwardly to engage their upper edge portions with said beams.

2. The combination of claim 1 wherein said sound stops comprise downwardly open channels which straddle the rails that are spaced beneath said beams.

3. The combination of claim 2 wherein each channel has a top longitudinally extending groove in which is disposed a strip of sound-absorbing material against the underside of the beam thereabove.

4. In combination, a building structure having a ceiling to which an overhead lighting system is secured and a parallel series of relatively widely spaced apart beams supporting said ceiling, a sub-ceiling framework comprising a first series of relatively closer spaced parallel rails in crosswise relation to said beams and hangar rods supporting said rails in predetermined spaced relation beneath said ceiling and said beams, and a second series of relatively closer spaced rails parallel to said beams and secured to said first series of rails with some of said second series disposed in spaced relation beneath said beams, said first and second series of rails defining a grid-like framework, a series of light-diffusing panels carried by said framework, and members compressively interposed between said beams and those of said second series of rails therebeneath to impart lateral rigidity to said framework and the light-diffusing panels carried thereby.

References Cited in the file of this patent

UNITED STATES PATENTS

| | | |
|---|---|---|
| 1,962,648 | Pflueger | June 12, 1934 |
| 2,188,527 | Carilli | Jan. 30, 1940 |
| 2,258,354 | Doane | Oct. 7, 1941 |
| 2,264,110 | Bridge | Nov. 25, 1941 |
| 2,349,158 | Fowles et al. | May 16, 1944 |
| 2,398,507 | Rolph | Apr. 16, 1946 |
| 2,440,603 | Guth | Apr. 27, 1948 |
| 2,447,694 | Finch | Aug. 24, 1948 |
| 2,480,427 | Stanton | Aug. 30, 1949 |
| 2,542,114 | Bridge | Feb. 20, 1951 |
| 2,680,502 | Kurtzon | June 8, 1954 |
| 2,684,498 | Zingone | July 27, 1954 |
| 2,691,720 | Simmons | Oct. 12, 1954 |
| 2,698,071 | Lee | Dec. 28, 1954 |